United States Patent
Okada et al.

(10) Patent No.: US 6,777,135 B2
(45) Date of Patent: Aug. 17, 2004

(54) NONAQUEOUS ELECTROLYTE SECONDARY CELL

(75) Inventors: Mikio Okada, Kyoto (JP); Hideo Yasuda, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 84 days.

(21) Appl. No.: 09/959,352

(22) PCT Filed: Feb. 21, 2001

(86) PCT No.: PCT/JP01/01249
§ 371 (c)(1),
(2), (4) Date: Oct. 24, 2001

(87) PCT Pub. No.: WO01/63687
PCT Pub. Date: Aug. 30, 2001

(65) Prior Publication Data
US 2003/0124429 A1 Jul. 3, 2003

(30) Foreign Application Priority Data
Feb. 24, 2000 (JP) .................... P. 2000-048344
Feb. 24, 2000 (JP) .................... P. 2000-048348

(51) Int. Cl.[7] ............................................ H01M 2/16
(52) U.S. Cl. .................. 429/252; 429/231.95; 429/251; 429/316
(58) Field of Search ................. 429/316, 306, 429/331, 231.95, 251, 252

(56) References Cited

U.S. PATENT DOCUMENTS 5,460,904 A * 10/1995 Gozdz et al. ............ 429/254 X
6,120,940 A * 9/2000 Poehler et al.
2002/0018935 A1 * 2/2002 Okada ................... 429/231.95
2003/0143461 A1 * 7/2003 Poehler et al.

FOREIGN PATENT DOCUMENTS

| JP | 6-52891 | 2/1994 |
| JP | 7-14608 | 1/1995 |
| JP | 8-180853 | 7/1996 |
| WO | WO 98/59384 | 12/1998 |

* cited by examiner

Primary Examiner—John S. Maples
(74) Attorney, Agent, or Firm—Sughrue Mion, PLLC (57) ABSTRACT

The non-aqueous electrolyte secondary battery of the present invention comprises, e.g., a positive electrode 6, a negative electrode 5, a polymer membrane 1 containing carbon powder or the like, and a separating membrane layer 7 for preventing shortcircuiting. A carbon powder, silicon powder, tin powder or aluminum powder 2 contained in the polymer membrane 1 containing carbon powder or the like absorbs as a lithium-absorbing material metallic lithium powders 3 or metallic lithium dendrite 4 which has been produced from the negative electrode 5 due to charge or discharge and takes no part in charge or discharge. This lithium-absorbing material is less reactive than the metallic lithium powders 3 or metallic lithium dendrite 4 and thus enhances the safety of the battery and controls shortcircuiting between the positive electrode and the negative electrode due to metallic lithium dendrite, making it possible to drastically improve charge and discharge cycle life performance.

7 Claims, 5 Drawing Sheets

NONAQUEOUS ELECTROLYTE SECONDARY CELL

TECHNICAL FIELD

The present invention relates to a non-aqueous electrolyte secondary battery.

BACKGROUND ART

Nowadays, the manganese dioxide-zinc battery is mainly used as a primary battery for power supply of electronic appliances. Nickel batteries such as the nickel-cadmium battery, the nickel-zinc battery and the nickel-metal hydride battery, as well as the lead acid battery are mainly used as a secondary battery for power supply of electronic appliances.

As the electrolyte for these batteries, there is used an aqueous solution of an alkali such a potassium hydroxide or an aqueous solution of sulfuric acid or the like. The theoretical decomposition voltage of water is 1.23 V. A battery having a voltage higher than 1.23 V can easily undergo decomposition of water and thus can hardly store the electric energy. Thus, a battery having an electromotive force of about 2 V at highest has been put in practical use. Therefore, in order to meet the demand for novel higher performance batteries meeting the development of electronic appliances, a high voltage battery having a voltage of 3 V or higher comprising a non-aqueous electrolyte as an electrolyte has been used. A typical example of such a battery is a lithium battery comprising metallic lithium as a negative active material. Examples of primary lithium battery include manganese dioxide-lithium battery, carbon fluoride-lithium battery, etc. Examples of secondary lithium battery include manganese dioxide-lithium battery, vanadium oxide-lithium battery, etc.

The secondary lithium battery using metallic lithium as the negative active materials is disadvantageous in that metallic lithium causes dendrite deposition, easily causing shortcircuiting that reduces battery life. Further, since metallic lithium has a high reactivity, it is difficult to secure safety. Therefore, a lithium ion battery comprising graphite or carbon instead of metallic lithium as a negative active material and lithium cobalt oxide, lithium nickel oxide or the like as a positive active material has been devised and used as a high energy density battery. However, with the recent expansion of usage, batteries having higher performance, higher energy density and higher safety have been desired.

Thus, a secondary lithium battery having a high energy density comprising metallic lithium as a negative active material is again attracting attention. However, as mentioned above, technical problems of short cycle life can still be hardly overcome, not to mention safety. Thus, such a secondary lithium battery has never been put in practical use.

Figure 3:
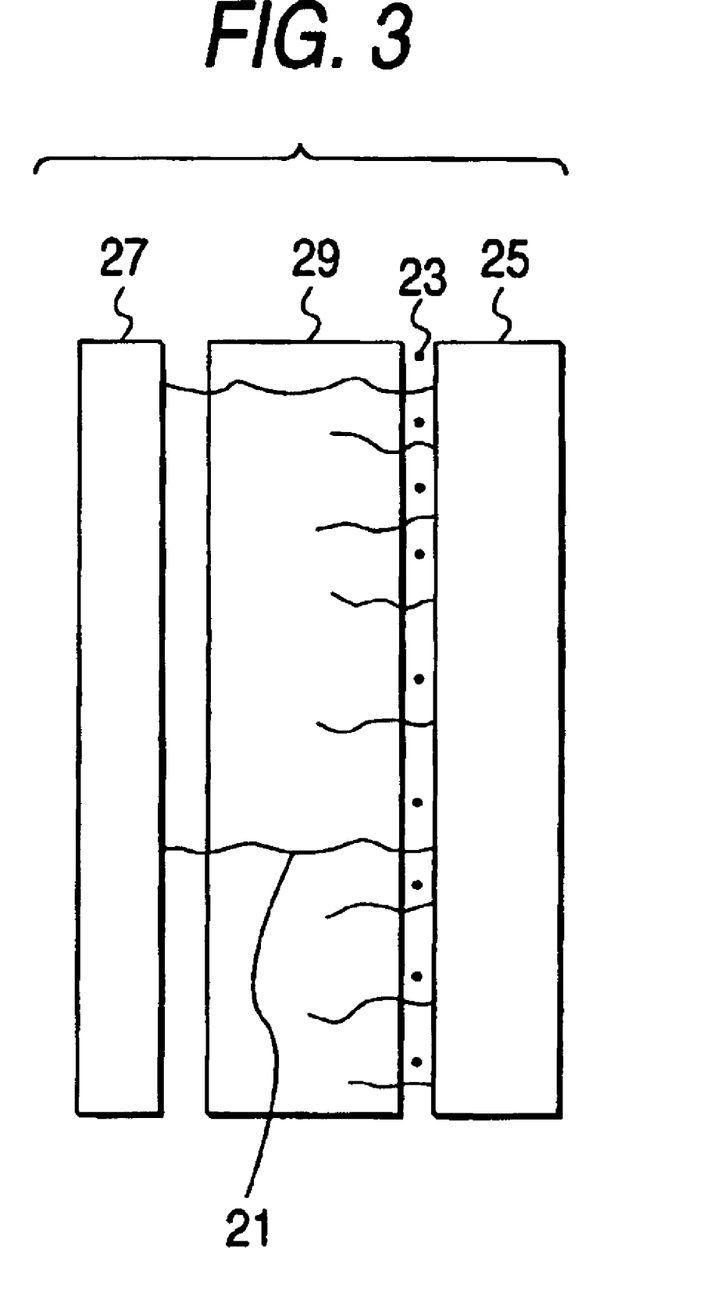
FIG. 3 is a drawing illustrating the schematic structure of the conventional non-aqueous electrolyte secondary battery.

In other words, when a secondary lithium battery comprising metallic lithium as a negative active material in a negative electrode 25 is repeatedly subjected to charge and discharge cycle, metallic lithium dendrite 21 of metallic lithium is produced and pierces a separator 29 to cause shortcircuiting during charge, as shown in FIG. 3. Further, fine metallic lithium powders 23 which does not participate in charge and discharge is accumulated in the vicinity of the negative electrode 25, lowering the discharge capacity and hence reducing the battery life.

In particular, a non-aqueous electrolyte secondary battery normally comprises as an electrolyte a combustible organic solvent that can cause heat generation and fuming and thus it is required to assure safety sufficiently. Thus, the use of various safety elements and polymer electrolytes which are less reactive with the electrode than the liquid electrolytes have been often attempted. Furthermore, some reports were made on the use of a porous polymer electrolyte and the incorporation of a liquid electrolyte in the pores (PROCEEDINGS of $16^{th}$ International Electric Vehicle Symposium, 1999, p156). However, the use of these safety elements or polymer electrolytes also are not sufficient for solving the foregoing problems of reduction of life and deterioration of battery safety by the production of metallic lithium dendrite or formation of fine metallic lithium powders.

The foregoing problems with secondary lithium battery comprising metallic lithium can occur also with the case where a lithium alloy or carbon material capable of absorbing and releasing lithium is used. In other words, in the case where the utilization of negative active material during charge or discharge is raised to enhance the energy density of the battery or a high rate or low temperature charge is carried out, metallic lithium dendrite is deposited on the surface of the negative active material, causing the same problem as occurring in the case of metallic lithium negative active material.

Therefore, an object of the present invention is to provide a non-aqueous electrolyte secondary battery having an excellent cycle life performance and an enhanced safety.

DISCLOSURE OF THE INVENTION

The present invention comprises a polymer membrane containing at least one material selected from the group consisting of carbon powder, silicon powder, tin powder and aluminum powder(hereinafter referred to as "carbon powder or the like"), wherein the membrane is provided between a positive electrode and a negative electrode. In accordance with the arrangement of the present invention, the carbon powder or the like, as a lithium-absorbing material, absorbs metallic lithium powders or dendrite which has been produced from the negative electrode due to charge or discharge and takes no part in charge or discharge. Since this lithium-absorbing material is less reactive than metallic lithium powders or dendrite, the resulting battery exhibits an enhanced safety. Further, since the metallic lithium powders or dendrite is absorbed by the carbon powder or the like, the internal shortcircuiting between the positive electrode and the negative electrode can be prevented, drastically improving the charge and discharge cycle life performance.

It is preferred that the polymer membrane containing carbon powder or the like be porous and particularly have a porosity of from 10% to 90%. When the polymer membrane containing carbon powder or the like is made porous, a liquid electrolyte can be retained in the pores. In this arrangement, the flow of liquid electrolyte caused by the volumetric change of the active material during charge or discharge occurs also in the polymer membrane via the liquid electrolyte retained in the pores. Metallic lithium powders or dendrite which has been released from the negative electrode and thus cannot be charged or discharged moves through pores of the polymer membrane on the flow of liquid electrolyte and thus can easily reach the carbon powder or the like.

Alternatively, a separating membrane layer may be further provided between the positive electrode and the polymer membrane.

BEST MODE FOR CARRYING OUT THE INVENTION

Figure 1:
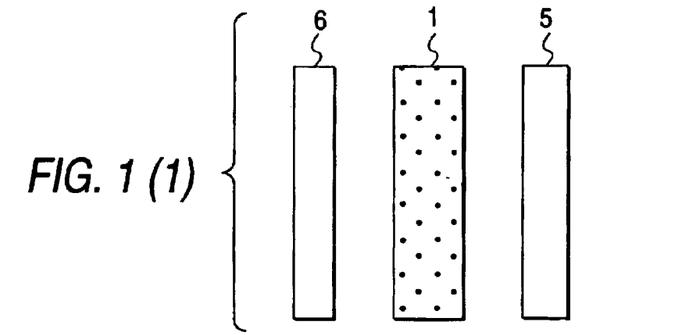
FIGS. 1 and 2 each are a drawing illustrating the schematic structure of the non-aqueous electrolyte secondary battery according to the present invention.
Figure 2:
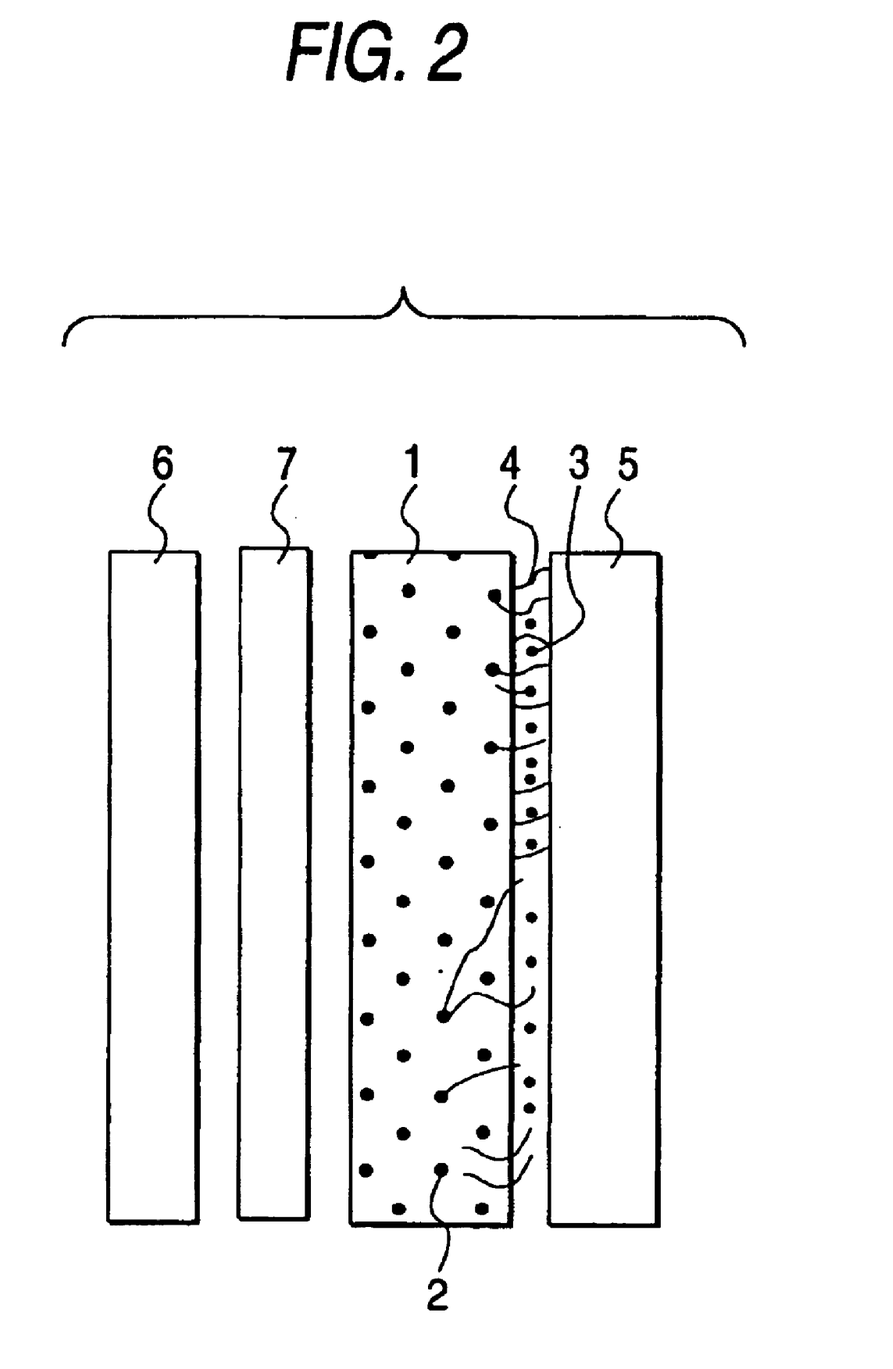

The present invention will be further described below in connection with the attached drawings. The present invention comprises a polymer membrane 1 containing carbon powder or the like, i.e., at least one material selected from the group consisting of carbon powder, silicon powder, tin powder and aluminum powder, wherein the polymer membrane 1 is provided between a positive electrode 6 and a negative electrode 5. FIGS. 1 and 2 each illustrate the schematic structure of one example of the non-aqueous electrolyte secondary battery of the present invention. The non-aqueous electrolyte secondary battery of the present invention comprises, e.g., a positive electrode 6, a negative electrode 5, a polymer membrane 1 containing carbon powder or the like and a separating membrane layer 7 received in a battery case which is not shown. The battery case contains a liquid electrolyte which is not shown. The carbon powder or the like 2 contained in the polymer membrane 1 containing. carbon powder or the like absorbs, as a lithium-intercalating material (e.g., $LiC_6$, $Li_nSn$), lithium powders 3 or dendrite 4 which has been produced from the negative electrode 5 due to charge or discharge and does not participate in charge or discharge. Since this lithium-absorbing material is less reactive than metallic lithium powders 3 or metallic lithium dendrite 4, the resulting battery exhibits an enhanced safety. Further, since metallic lithium powders 3 or metallic lithium dendrite 4 is absorbed by the carbon powder or the like, the internal shortcircuiting between the positive electrode 6 and the negative electrode 5 can be prevented, drastically improving the charge and discharge cycle life performance.

In the present invention, the separating membrane layer 7 is not essential but is preferably used. The positioning of the various elements in the case where the positive electrode 6, the negative electrode 5, the polymer membrane 1 containing carbon powder or the like 2 and the separating membrane layer 7 are provided is not specifically limited. As shown in FIG. 1, these elements may be laminated in any order, e.g., a positive electrode 6-*a* polymer membrane 1 containing carbon powder or the like-a negative electrode 5, a positive electrode 6-*a* separating membrane layer 7-*a* polymer membrane 1 containing carbon powder or the like-a negative electrode 5, a positive electrode 6-*a* polymer membrane 1 containing carbon powder or the like-a separating membrane layer 7-*a* negative electrode 5, a positive electrode 6-*a* separating membrane layer 7-*a* polymer membrane 1 containing carbon powder or the like-*a* separating membrane layer 7-*a* negative electrode 5, etc.

By providing the separating membrane layer 7, shortcircuiting can be more effectively prevented. However, the separating membrane layer 7 is preferably interposed between the positive electrode 6 and the polymer membrane 1 containing carbon powder or the like (FIG. 1(2)). This is because that the separating membrane layer 7 provided between the negative electrode 5 and the polymer membrane 1 containing carbon powder or the like (FIGS. 1(3) and 1(4)) makes it possible to prevent the reaction of metallic lithium powders 3 or metallic lithium dendrite 4 produced from the negative electrode 5 with the carbon powder or the like 2.

The polymer membrane 1 containing carbon powder or the like 2 and the separating membrane layer 7 each are not required to be an independent membrane, but one sheet of polymer membrane may have the effect of the two elements. In other words, the distribution of the concentration of the carbon powder or the like 2 may vary in one sheet of polymer membrane. For example, by increasing the concentration of carbon powder or the like 2 in the polymer membrane on the side which is in contact with the negative electrode 5 and lowering the concentration of carbon powder or the like 2 in the polymer membrane on the side which is in contact with the positive electrode 6, the separating membrane layer 7 and the polymer membrane 1 containing carbon powder or the like can be integrated into one.

In accordance with the present invention, excellent properties can be obtained also with a non-aqueous electrolyte secondary battery comprising each of negative electrodes such as a negative electrode containing metallic lithium, a negative electrode containing lithium alloy, a electrode containing a mixture of metallic lithium and a carbon material, and a negative electrode containing a mixture of lithium alloy and a carbon material.

Examples of the non-aqueous electrolyte secondary battery comprising a negative electrode containing metallic lithium include a non-aqueous electrolyte secondary battery comprising a negative electrode containing metallic lithium incorporated therein in advance and a non-aqueous electrolyte secondary battery comprising a negative electrode on which metallic lithium is not produced until charge. For example, a non-aqueous electrolyte secondary battery which has no metallic lithium formed on the negative electrode in the initial stage after assembly but has metallic lithium formed on the negative electrode during initial charge may be included. Examples of the non-aqueous electrolyte secondary battery comprising a negative electrode containing lithium alloy include a battery comprising as a negative active material a metal which absorbs lithium to form an alloy during charge but does not form a lithium alloy in the discharged state. The metal which forms an alloy with lithium is not specifically limited. Examples of such a metal include Al, Si, Pb, Sn, Zn, and Cd. These metals may be used in admixture. When a carbon material is used as the negative active material, either graphite or low crystallinity carbon may be used. The form of the carbon material is not specifically limited. For example, the carbon material may be spherical, fibrous or lumpy. Alternatively, a mixture of metallic lithium, lithium alloy and carbon material may be used as a negative active material.

As the compound capable of absorbing/releasing lithium to be used as a positive active material, there may be used an inorganic compound such as composite oxide represented by the composition formula $Li_xMO_2$ or $Li_yM_2O_4$ (in which M represents a transition metal, x represents a number satisfying the relationship $0 \leq x \leq 1$, and y represents a number satisfying the relationship $0 \leq y \leq 2$), oxide having tunnel-like pores or layer structure metal chalcogenide. Specific examples of these inorganic compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, $TiS_2$, $NiOOH$, $FeOOH$, $FeS$, and $LiMnO_2$. Examples organic compounds to be used as the positive active material include electrically-conductive polymers such as polyaniline, etc. For example, the foregoing various active materials may be used in admixture regardless of whether they are inorganic or organic compounds.

The form of the element, which is composed of the positive electrode, the polymer membrane, the negative electrode, and so on, according to the present invention is not specifically limited. It may be in either a stack or spiral coil of thin sheets of the positive electrode, the polymer membrane, the negative electrode, and so on.

The polymer to be used in the polymer membrane containing carbon powder or the like in the non-aqueous electrolyte secondary battery of the present invention is not specifically limited. For example, there may be used, singly or in admixture, the following polymers: polyether such as polyacrylonitrile, poly(ethylene oxide) and poly(propylene oxide), polyacrylonitrile, poly(vinylidene fluoride), poly(vinylidene chloride), poly(methyl methacrylate), poly(methyl acrylate), poly(vinyl alcohol), polymethacrylonitrile, poly(vinyl acetate), poly(vinyl pyrrolidone), polyethylenimine, polybutadiene, polystyrene, polyisoprene, styrene-butadiene rubber, nitrile rubber, derivative thereof. Alternatively, copolymers obtained by the copolymerization of various monomers constituting the foregoing polymers may be used.

The polymer membrane containing carbon powder or the like of the present invention comprises carbon powder, silicon powder, tin powder or aluminum powder incorporated therein. The diameter of carbon powder, silicon powder, tin powder or aluminum powder is from 0.02 $\mu$m to 30 $\mu$m, preferably from 0.1 $\mu$m to 20 $\mu$m, more preferably from 0.3 $\mu$m to 10 $\mu$m. Further, carbon powder, silicon powder, tin powder and aluminum powder may be used singly or in admixture. Preferred among these powder materials is carbon powder. This is because lithium ion can be diffused in carbon powder at a high rate to readily produce a lithium-absorbing material. The carbon material to be used herein is not specifically limited. For example, graphite, so-called hard carbon, etc. may be used.

The preferred volumetric ratio of carbon powder or the like varies with the porosity of the polymer membrane described later. For example, in the case where the porosity of the polymer membrane is 30%, the volumetric proportion of carbon powder or the like in the polymer membrane containing carbon powder or the like is from 1% to 30%, preferably from 3% to 25%. The term "volumetric proportion of carbon powder or the like in the polymer membrane" as used herein is meant to indicate the proportion of the volume of carbon powder or the like in the apparent volume of the polymer membrane including the pores if the polymer membrane is porous. In the case where the porosity of the polymer membrane is 10%, the volumetric proportion of carbon powder or the like in the polymer membrane containing carbon powder or the like is from 1% to 40%, preferably from 3% to 30%. In the case where the porosity of the polymer membrane is 50%, the volumetric proportion of carbon powder or the like in the polymer membrane containing carbon powder or the like is from 1% to 28%, preferably from 3% to 22%. In the case where the porosity of the polymer membrane is 90%, the volumetric proportion of carbon powder or the like in the polymer membrane containing carbon powder or the like is from 1% to 8%, preferably from 3% to 6%.

For example, when the porosity of the polymer membrane is 30% and the volumetric proportion of carbon powder is less than 1%, metallic lithium powders or dendrite cannot be thoroughly converted to a lithium-absorbing material.

On the contrary, in the case where the volumetric proportion of carbon powder or the like is greater than 30%, carbon powders come in contact with each other, making it easy to form an electronically-conductive network. Therefore, once charge has been made while a part of the carbon powder or the like is in contact with metallic lithium electrodeposited on the negative electrode, the carbon powder or the like as a whole can be charged in preference to the negative electrode. As a result, lithium which is intended to be deposited on the negative electrode during charge reacts with the carbon powder or the like to produce a lithium-absorbing material, causing a drastic reduction of absorption of metallic lithium powders or dendrite by the carbon powder or the like. Therefore, it is thought that shortcircuiting, etc. can easily occur to deteriorate the cycle life performance of the battery.

The carbon powders or the like preferably do not come in contact with each other as much as possible. This is because it is considered that, when the carbon powders or the like condense and come in contact with each other to form an electronically-conductive network, a phenomenon as occurring in the case where the volumetric proportion of carbon powder is not smaller than 30% can easily occur, deteriorating the cycle life performance.

It is also preferred that the polymer membrane containing carbon powder or the like be porous and a liquid electrolyte be retained in the pores. In this arrangement, the flow of liquid electrolyte caused by the volumetric change of active material during charge or discharge occurs also in the polymer membrane via the liquid electrolyte retained in the pores. Metallic lithium powders or dendrite which has been released from the negative electrode and thus cannot be charged or discharged moves through the polymer membrane on the flow of liquid electrolyte and thus can easily reach the carbon powder or the like in the polymer membrane. In this case, it is effective to arrange that the carbon powder or the like is exposed on the surface of the pores in the polymer membrane to come in contact with the liquid electrolyte, because the carbon powder or the like and metallic lithium powder or dendrite come in contact with each other and thus can react easily with each other.

By making the polymer membrane containing carbon powder or the like to be porous and retaining a liquid electrolyte in the pores, the coefficient of ion diffusion can be enhanced. Further, when polyacrylonitrile, a polyether such as poly(ethylene oxide) and poly(propylene oxide), polyacrylonitrile, poly(vinylidene fluoride) or the like is used as a polymer, the ionic conductivity can be further enhanced because the polymer itself is ionically conductive, making it possible to obtain a non-aqueous electrolyte secondary battery having an excellent discharge performance.

The porosity and pore diameter of the polymer membrane containing carbon powder or the like are not specifically limited. In order to improve the charge and discharge cycle life performance of the battery, however, the porosity of the polymer membrane is preferably from 10% to 90%, and the diameter of the pores is preferably from 0.003 $\mu$m to 10 $\mu$m. The term "porosity of the polymer membrane containing carbon powder or the like" as used herein is meant to indicate the proportion of the volume of pores determined by subtracting the volume of solid matters such as polymer and carbon powder or the like from the apparent volume of the membrane having pores in the apparent volume of the membrane having pores.

An example of the process for the preparation of the polymer membrane containing carbon powder or the like will be described hereinafter. Firstly, a mixture of a solvent for dissolving a polymer therein, a polymer and carbon powder or the like is stirred to dissolve the polymer in the solvent. The paste thus prepared is applied to a glass plate to a uniform thickness, and then dipped in water to remove the solvent and hence solidify the polymer. Thus, a polymer membrane containing carbon powder or the like is prepared. When the polymer is solidified, the passage through which the solvent escapes to water forms a pore. The resulting membrane is a porous membrane having continuous pores. By drying this membrane in vacuo to remove water, a polymer membrane containing carbon powder or the like can be obtained. By pressing this membrane properly, polymer membranes containing carbon powder or the like having various porosities can be obtained. The thickness of the polymer membrane containing carbon powder or the like is from 0.1 $\mu$m to 40 $\mu$m, preferably from 0.5 $\mu$m to 30 $\mu$m, more preferably from 2 $\mu$m to 25 $\mu$m.

The solvent for dissolving the polymer therein is not specifically limited. Examples of the solvent employable herein include carbonate such as propylene carbonate, ethylene carbonate, dimethyl carbonate, diethyl carbonate and ethyl methyl carbonate, ether such as dimethyl ether, diethyl ether, ethyl methyl ether and tetrahydrofuran (THF), ketone such as methyl ethyl ketone (MEK) and acetone, dimethylacetamide, 1-methyl-pyrrolidinone, n-methyl-pyrrolidone (NMP), dimethylformamide (DMF), and dimethyl sulfoxide (DMSO).

When an electrolyte solution is used in the non-aqueous electrolyte secondary battery according to the present invention, the solvent for liquid electrolyte is not specifically limited. For example, the following solvents may be used: polar solvents such as ethylene carbonate, propylene carbonate, dimethyl carbonate, diethyl carbonate, methyl ethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofurane, 2-methyltetrahydrofurane, dioxolane and methyl acetate, and mixtures thereof.

A lithium salt may be contained in a lithium-ion conductive polymer and non-aqueous liquid electrolyte. For example, examples of the lithium salt include, lithium salt such as $LiPF_6$, $LiBF_4$, $LiAsF_6$, $LiClO_4$, LiSCN, LiI, LiBr, $LiCF_3CO_2$, $LiCF_3SO_3$, $LiN(SO_2CF_3)_2$, $LiN(SO_2CF_2CF_3)_2$, $LiN(COCF_3)_2$, $LiN(COCF_2CF_3)_2$, and mixtures thereof. The salt present in the polymer membrane containing carbon powder or the like and the salt present in the non-aqueous liquid electrolyte may differ from each other. As the solid electrolyte, there may be used and inorganic solid electrolyte or polymer solid electrolyte.

The separating membrane layer of the present invention is not specifically limited. For example, an insulating polyethylene microporous membrane impregnated with a liquid electrolyte, a polymer solid electrolyte, a gel-like electrolyte having a liquid electrolyte incorporated in a polymer solid electrolyte or the like may be used. Alternatively, an insulating microporous membrane, a polymer solid electrolyte, etc. may be used in combination. Further, when a porous polymer solid electrolyte membrane is used as the polymer solid electrolyte, the liquid electrolyte to be contained in the polymer and the liquid electrolyte to be incorporated in the pores may differ from each other.

The material of the battery case is not specifically limited. For example, any of a sheet obtained by laminating a metal foil with a resin film, iron, and aluminum may be used.

EXAMPLE 1

A mixture of 70 wt % of $LiCoO_2$, 6 wt % of acetylene black, 9 wt % of a polyvinylidene fluoride (PVDF) and 15 wt % of n-methylpyrrolidone (NMP) was applied to an aluminum foil having a width of 110 mm and a thickness of 20 $\mu$m, and then dried at a temperature of 150° C. to evaporate NMP. The foregoing procedure was conducted on both sides of the aluminum foil. The aluminum foil was then pressed. The aluminum foil was then cut into a strip having a width of 20 mm to form a positive electrode.

A metallic lithium foil having a thickness of 15 $\mu$m was stuck on both sides of a copper foil having a thickness of 10 $\mu$m and a width of 21 mm to form a negative electrode.

A 50:5:1 mixture (by weight) of NMP, PVDF and a spherical graphite powder having a diameter of 2 $\mu$m was stirred for 10 hours to dissolve PVDF in NMP. The paste thus prepared was then applied to a glass plate to a uniform thickness. The glass plate was then dipped in water to remove NMP and hence solidify PVDF. Thus, a PVDF membrane containing graphite powders was prepared. When the polymer was solidified, the passage through which NMP escapes to water formed a pore. The resulting membrane was a porous membrane having continuous pores. The membrane thus prepared was then dried at a temperature of 65° C. in vacuo for 10 hours to remove water. 10 kinds of PVDF membranes having different thicknesses were prepared. These PVDF membranes were then pressed to form membranes having a thickness of 8 $\mu$m. The PVDF membranes thus pressed had a porosity of 90%, 80%, 70%, 60%, 50%, 40%, 30%, 20%, and 10%, respectively.

The positive electrode, the negative electrode, the PVDF membrane and the polyethylene separator having a porosity of 40% and a thickness of 25 $\mu$m were then laminated in the order of the positive electrode, the separator, the PVDF membrane, the negative electrode, the PVDF membrane and the separator. The laminate thus obtained was wound, and then inserted in a prismatic aluminum case having a height of 47.0 mm, a width of 22.2 mm and a thickness of 7.0 mm. Into the aluminum case was then injected a liquid electrolyte obtained by mixing ethylene carbonate (EC) and dimethyl carbonate (DMC) at a volumetric ratio of 1:1, and then adding 1 mol/l of $LiPF_6$ to the mixture to prepare a battery according to the present invention. The capacity of the battery thus formed was about 900 mAh. In the battery, PVDF swelled with the liquid electrolyte to form a polymer electrolyte membrane in which not only the liquid electrolyte contained in the pores of the FVDF membrane but also PVDF thus swollen is lithium-ionically conductive. The foregoing aluminum case was grooved (so-called irrecoverable safety valve) so that when the inner pressure of the battery rises, the aluminum case cracks at the groove to release gas from the battery and hence prevent the battery from rupturing. Batteries comprising PVDF membranes having a porosity of 90%, 80%, 70%, 60%, 50%, 40%, 30%, 20% and 10% were designated as batteries (A1), (A2), (A3), (A4), (A5), (A6),, (A7), (A8) and (A9) of the present invention, respectively.

A battery (B) according to the present invention was prepared in the same manner as the battery (A1) of the present invention except that a paste obtained by stirring a mixture of NMP, PVDF and a graphite powder to dissolve PVDF in NMP was not dipped in water but was directly heated and dried to remove NMP and hence solidify PVDF, thus preparing a PVDF membrane containing graphite powders. In this case, PVDF was not rendered porous. Thus, the porosity of the PVDF membrane can be calculated to be 0%.

Further, a conventional known comparative battery (C) was prepared in the same manner as the battery (A1) of the present invention except that an element obtained by winding a laminate of a positive electrode, a separator, a negative electrode and a separator in this order free of PVDF membrane containing a graphite powder was inserted into the battery case.

Moreover, a conventional known comparative battery (D) was prepared in the same manner as the battery (A2) of the present invention except that a PVDF membrane having a porosity of 80% free of graphite powder was used instead of the PVDF membrane containing a graphite powder.

Two samples of the batteries of the present invention and comparative batteries thus prepared were then subjected to 10 cycle life test. In the cycle life test, one cycle is 2 hour of constant voltage charge at 4.2 V after constant current charge to 4.2 V with a current of 450 mA and constant current discharge to 3.0 V with a current of 450 mA. One sample of the batteries which had been subjected to 10 cycles of charge and discharge was fully charged in the same manner as in the cycle test and was then subjected to safety test with a 3-mm diameter nail penetration therethrough. Another sample of the batteries which had been subjected to 10 cycle of charge and discharge was disassembled to examine the amount of metallic lithium dendrite produced in the battery. As a result of the foregoing safety test with a nail penetration therethrough, none of the batteries of the present invention (A1 to A9 and B) showed fuming, ignition and case rupture regardless of porosity of PVDF membrane, demonstrating that these batteries have no safety problem. On the contrary, both the comparative batteries (C) and (D) showed case rupture and vigorous ignition. Further, as a result of disassembly investigation, the batteries of the present invention comprising a PVDF membrane having a porosity of from not smaller than 10% to not greater than 90% were confirmed to have almost no metallic lithium dendrite deposited on the interior of the battery. However, the battery (B) of the present invention, which comprised a PVDF membrane having a porosity of 0%, was confirmed to have a small amount of metallic lithium dendrite deposited in the PVDF membrane. On the contrary, the comparative batteries (C) and (D) were confirmed to have a large amount of metallic lithium dendrite attached to the separator. As can be seen in the foregoing results, the batteries of the present invention comprise a polymer containing carbon powders reactive with lithium, wherein the polymer is connected to the surface of the negative electrode, so that the carbon powders incorporated in the polymer and metallic lithium powders or dendrite produced by charge or discharge react with each other to produce a lithium-absorbing material, reducing reactivity and hence improving safety. The results of the cycle life test on these batteries are set forth in Table 1. As can be seen in Table 1, all the batteries of the present invention exhibit better cycle life performance than the comparative batteries. It can also been seen in Table 1 that the batteries comprising a PVDF membrane having a porosity of not smaller than 10% exhibit an extremely excellent cycle life performance as compared with those comprising a PVDF membrane having a porosity of 0%. This is presumably because, when the PVDF membrane is porous, metallic lithium powders or dendrite which has been released from the negative electrode and cannot be charged and discharged moves through the pores in the polymer membrane on the flow of liquid electrolyte caused by the volumetric change of the active material during charge and discharge Since even the batteries comprising a PVDF membrane having a porosity of 0% showed drastic improvement of safety and cycle life performance as compared with the comparative batteries, it is considered that the present invention is sufficiently effective.

TABLE 1

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (A1) | 90 | 903 | 661 | 73.2 |
| Battery of the invention (A2) | 80 | 902 | 650 | 72.1 |
| Battery of the invention (A3) | 70 | 904 | 637 | 70.5 |
| Battery of the invention (A4) | 60 | 902 | 643 | 71.3 |
| Battery of the invention (A5) | 50 | 902 | 677 | 75.0 |
| Battery of the invention (A6) | 40 | 905 | 664 | 73.4 |
| Battery of the invention (A7) | 30 | 903 | 657 | 72.8 |
| Battery of the invention (A8) | 20 | 907 | 669 | 73.8 |
| Battery of the invention (A9) | 10 | 903 | 646 | 71.5 |
| Battery of the invention (B) | 0 | 904 | 485 | 53.7 |
| Comparative Battery (C) | — | 905 | 291 | 32.1 |
| Comparative Battery (D) | 80 | 903 | 335 | 37.1 |

EXAMPLE 2

Batteries (E1), (E2), (E3), (E4), (E5), (E6), (E7), (E8), (E9) and :(F) according to the present invention were prepared in the same manner as the batteries (A1), (A2), (A3), (A4), (A5), (A6), (A7), (A8), (A9) and (B) of the present invention of Example 1 except that silicon powders having a diameter of 2 $\mu$m were contained in the PVDF membrane instead of graphite powders. These batteries were then subjected to 10 cycle life test and safety test with a nail penetration therethrough after the 10 cycle life test and disassembled and examined for amount of metallic lithium dendrite in the same manner as in Example 1. These batteries showed quite the same results as in Example 1, which used graphite powders, with respect to the safety test with a nail penetration therethrough and examination for amount of metallic lithium dendrite. The results of cycle life test on the batteries of the present invention prepared in Example 2 are set forth in Table 2 with those of the comparative batteries (C) and D) prepared in Example 1. As can be seen in Table 2, all the batteries of the present invention exhibit better cycle life performance than the comparative batteries. These results show that the PVDF membrane having silicon powders incorporated therein, too, can have the same effect as the PVDF membrane having graphite powders incorporated therein.

TABLE 2

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (E1) | 90 | 908 | 686 | 75.6 |
| Battery of the invention (E2) | 80 | 903 | 698 | 77.3 |

TABLE 2-continued

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (E3) | 70 | 903 | 653 | 72.3 |
| Battery of the invention (E4) | 60 | 907 | 676 | 74.5 |
| Battery of the invention (E5) | 50 | 905 | 662 | 73.2 |
| Battery of the invention (E6) | 40 | 901 | 665 | 73.8 |
| Battery of the invention (E7) | 30 | 903 | 651 | 72.1 |
| Battery of the invention (E8) | 20 | 908 | 675 | 74.3 |
| Battery of the invention (E9) | 10 | 903 | 667 | 73.9 |
| Battery of the invention (F) | 0 | 905 | 437 | 48.3 |
| Comparative Battery (C) | — | 905 | 291 | 32.1 |
| Comparative Battery (D) | 80 | 903 | 335 | 37.1 |

EXAMPLE 3

Batteries (G1), (G2), (G3), (G4), (G5), (G6), (G7), (G8), (G9) and (H) according to the present invention were prepared in the same manner as the batteries (A1), (A2), (A3), (A4), (A5), (A6), (A7), (A8), (A9) and (B) of the present invention of Example 1 except that tin powders having a diameter of 1 μm were contained in the PVDF membrane instead of graphite powders. These batteries were then subjected to 10 cycle life test and safety test with a nail penetration therethrough after the 10 cycle life test and disassembled and examined for amount of metallic lithium dendrite in the same manner as in Example 1. These batteries showed quite the same results as in Example 1, which used graphite powders, with respect to the safety test with a nail penetration therethrough and examination for amount of metallic lithium dendrite. The results of cycle life test on the batteries of the present invention prepared in Example 3 are set forth in Table 3 with those of the comparative batteries (C) and (D) prepared in Example 1. As can be seen in Table 3, all the batteries of the present invention exhibit better cycle life performance than the comparative batteries. These results show that the PVDF membrane having tin powders incorporated therein, too, can have the same effect as the PVDF membrane having graphite powders incorporated therein.

TABLE 3

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (G1) | 90 | 903 | 651 | 72.1 |
| Battery of the invention (G2) | 80 | 904 | 667 | 73.8 |
| Battery of the invention (G3) | 70 | 907 | 647 | 71.3 |
| Battery of the invention (G4) | 60 | 903 | 661 | 73.2 |

TABLE 3-continued

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (G5) | 50 | 902 | 677 | 75.0 |
| Battery of the invention (G6) | 40 | 903 | 659 | 73.0 |
| Battery of the invention (G7) | 30 | 905 | 659 | 72.8 |
| Battery of the invention (G8) | 20 | 902 | 657 | 72.8 |
| Battery of the invention (G9) | 10 | 908 | 652 | 71.8 |
| Battery of the invention (H) | 0 | 903 | 427 | 47.3 |
| Comparative Battery (C) | — | 905 | 291 | 32.1 |
| Comparative Battery (D) | 80 | 903 | 335 | 37.1 |

EXAMPLE 4

Batteries (I1), (I2), (I3), (I4), (I5), (I6), (I7), (I8), (I9) and (J) according to the present invention were prepared in the same manner as the batteries (A1), (A2), (A3), (A4), (A5), (A6), (A7), (A8) and (A9) of the present invention of Example 1 except that aluminum powders having a diameter of 1 μm were contained in the PVDF membrane instead of graphite powders. These batteries were then subjected to 10 cycle life test and safety test with a nail penetration therethrough after the 10 cycle life test and disassembled and examined for amount of metallic lithium dendrite in the same manner as in Example 1. These batteries showed quite the same results as in Example 1, which used graphite powders, with respect to the safety test with a nail penetration therethrough and examination for amount of metallic lithium dendrite. The results of cycle life test on the batteries of the present invention prepared in Example 3 are set forth in Table 4 with that of the comparative batteries (C) and (D) prepared in Example 1. As can be seen in Table 4, all the batteries of the present invention exhibit better cycle life performance than the comparative batteries. These results show that the PVDF membrane having aluminum powders incorporated therein, too, can have the same effect as the PVDF membrane having graphite powders incorporated therein.

TABLE 4

| Battery | Porosity of PVDF membrane (%) | Capacity at 1st cycle of cycle test (mAh) | Capacity at 10th cycle of cycle test (mAh) | Capacity retention after cycle test (%) |
|---|---|---|---|---|
| Battery of the invention (I1) | 90 | 904 | 626 | 69.3 |
| Battery of the invention (I2) | 80 | 908 | 638 | 70.3 |
| Battery of the invention (I3) | 70 | 908 | 616 | 67.8 |
| Battery of the invention (I4) | 60 | 907 | 628 | 69.2 |
| Battery of the invention (I5) | 50 | 903 | 643 | 71.2 |
| Battery of the invention (I6) | 40 | 907 | 619 | 68.3 |

TABLE 4-continued

| Battery | Porosity of PVDF membrane (%) | Capacity at 1st cycle of cycle test (mAh) | Capacity at 10th cycle of cycle test (mAh) | Capacity retention after cycle test (%) |
| --- | --- | --- | --- | --- |
| Battery of the invention (I7) | 30 | 906 | 641 | 70.8 |
| Battery of the invention (I8) | 20 | 904 | 621 | 68.7 |
| Battery of the invention (I9) | 10 | 902 | 625 | 69.3 |
| Battery of the invention (J) | 0 | 907 | 452 | 49.8 |
| Comparative Battery (C) | — | 905 | 291 | 32.1 |
| Comparative Battery (D) | 80 | 903 | 335 | 37.1 |

EXAMPLE 5

Figure 4:
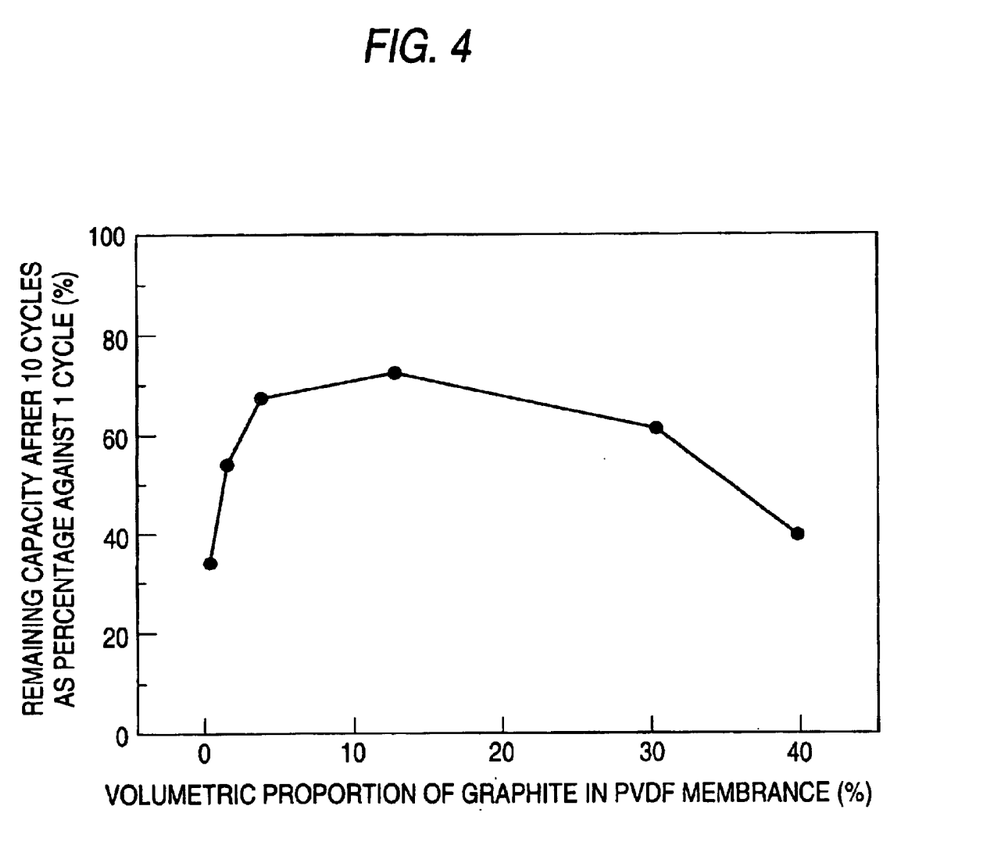
FIG. 4 is a graph illustrating the cycle life performance of Example 5.

Batteries (K1), (K2), (K3), (K4) and (KS) according to the present invention were prepared in the same manner as the battery (A7) of the present invention of Example 1 except that the mixing ratio of graphite powders and PVDF in the preparation of PVDF membrane containing graphite powders was varied so that the volumetric proportion of graphite in the membrane was 1%, 3%, 12%, 30% and 40%. Further, a conventional known comparative battery (L) was prepared in the same manner as the battery (A7) of the present invention of Example 1 except that the PVDF membrane had no graphite powder incorporated therein. All the batteries prepared in Example 5 comprised a PVDF membrane having a porosity of 30%. These batteries were then subjected to 10 cycle life test in the same manner as in Example 1. The results are shown in FIG. 4. As can be seen in FIG. 4, the batteries comprising a polymer membrane having graphite incorporated therein in a volumetric proportion of from 1% to 30% exhibit a particularly excellent cycle life performance. When the volumetric proportion of graphite in the polymer membrane is too high, graphite powders come in contact with each other to form an electronically-conductive network. Therefore, when a part of the carbon powder is in contact with metallic lithium electrodeposited on the negative electrode, graphite as a whole can be charged in preference to the deposition of metallic lithium during charge. As a result, the absorption of metallic lithium released from the negative electrode by graphite is drastically reduced, causing the drop of cycle life performance of the battery.

The PVDF membranes containing graphite powders used in the batteries (K4) and (K5) of the present invention were each clamped between two sheets of gold-plated. electrodes having a diameter of 19 mm and then measured for electronic conductivity. The battery (K4) exhibited an electronic conductivity of 0.06 S/cm while the battery (K5) exhibited an electronic conductivity of 0.9 S/cm. The battery (K5) according to the present invention has a high electrical conductivity between graphite powders and thus exhibits deteriorated cycle life performance as compared with the battery (K4). Thus, the electrical conductivity of the polymer membrane containing carbon powder or the like, wherein the membrane is provided between the positive electrode and the negative electrode, is preferably not greater than 0.06 S/cm.

In the case where a tin, silicon or aluminum powder was used instead of graphite, similar effect was obtained.

EXAMPLE 6

Figure 5:
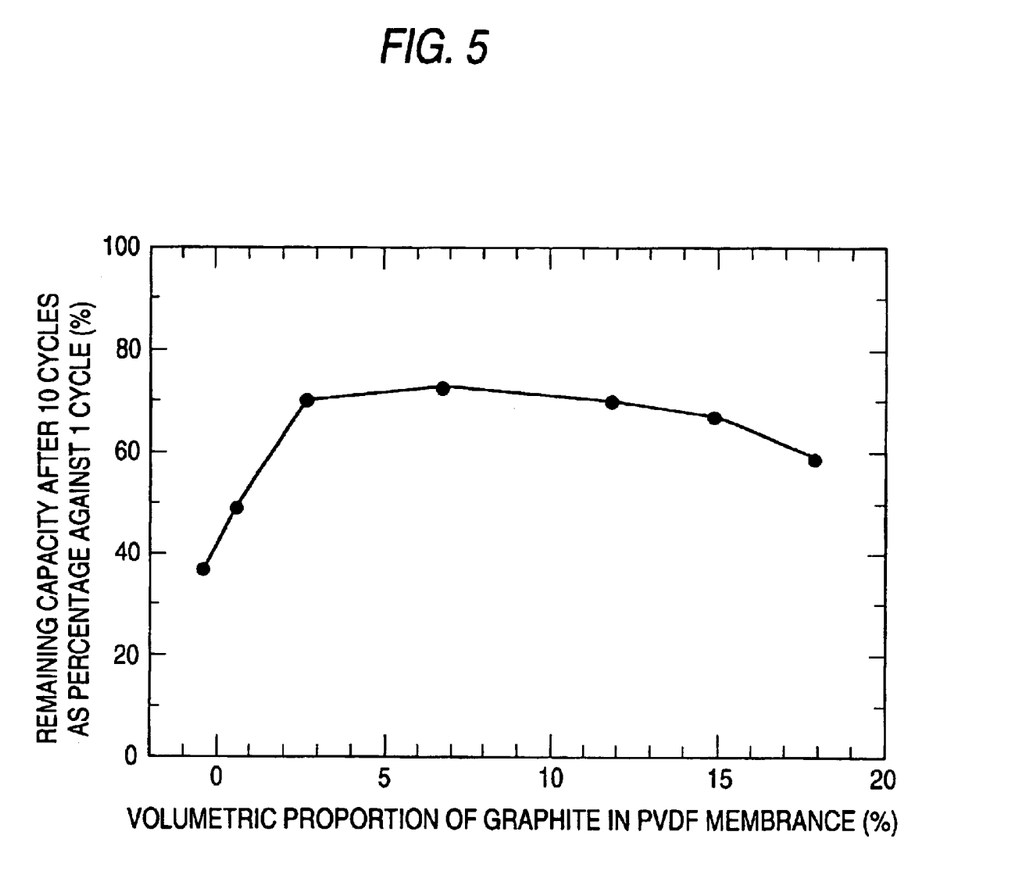
FIG. 5 is a graph illustrating the cycle life performance of Example 6.

Batteries (M1), (M2), (M3), (M4) and (M5) according to the present invention were prepared in the same manner as the battery (A2) of the present invention of Example 1 except that the mixing ratio of graphite powders and PVDF in the preparation of PVDF membrane containing graphite powders was varied so that the volumetric proportion of graphite in the membrane was 1%, 3%, 7%, 12%, 15% and 18%. Further, a conventional known comparative battery (N) was prepared in the same manner as the battery (A2) of the present invention of Example 1 except that the PVDF membrane had no graphite powder incorporated therein. All the batteries prepared in Example 6 comprised a PVDF membrane having a porosity of 80%. These batteries were then subjected to 10 cycle life test in the same manner as in Example 1. The results are shown in FIG. 5. As can be seen in FIG. 5, the batteries comprising a polymer membrane having graphite incorporated therein in a volumetric proportion of from 1% to 18% exhibit a particularly excellent cycle life performance. When the volumetric proportion of graphite in the polymer membrane is too great, graphite powders come in contact with each other to form an electronically-conductive network. Therefore, when a part of the carbon powder is in contact with metallic lithium electrodeposited on the negative electrode, graphite can be entirely charged in preference to the deposition of metallic lithium during charge. As a result, it is considered that the absorption of metallic lithium released from the negative electrode by graphite is drastically reduced, causing the drop of cycle life performance of the battery.

In the case where a tin, silicon or aluminum powder was used instead of graphite, similar effect was obtained.

INDUSTRIAL APPLICABILITY

The non-aqueous electrolyte secondary battery of the present invention comprises a polymer membrane containing at least one material selected from the group consisting of carbon powder, silicon powder, tin powder and aluminum powder, wherein the membrane is provided between a positive electrode and a negative electrode. In accordance with the arrangement of the present invention, the carbon powder, silicon powder, tin powder or aluminum powder contained in the polymer membrane containing carbon powder or the like and hardly dischargeable metallic lithium powders or dendrite which has been produced due to charge or discharge react with each other to produce a lithium-absorbing material. Since this lithium-absorbing material is less reactive than metallic lithium powders or dendrite, the resulting battery exhibits an enhanced safety. Accordingly, the non-aqueous electrolyte secondary battery of the present invention can be expected to be used in various fields as a battery having an enhanced safety.

What is claimed is:

1. A non-aqueous electrolyte secondary battery comprising:
   a positive electrode,
   a negative electrode,
   a non-aqueous electrolyte, and
   a polymer membrane containing at least one material selected from the group consisting of carbon powder, silicon powder, tin powder and aluminum powder, wherein said polymer membrane is provided between said positive electrode and said negative electrode.

2. The non-aqueous electrolyte secondary battery defined in claim 1, wherein said polymer membrane is porous.

3. The non-aqueous electrolyte secondary battery defined in claim 2, wherein said polymer membrane has a porosity of from 10% to 90%.

4. The non-aqueous electrolyte secondary battery defined in any one of claims 1 to 3, wherein said polymer membrane is in direct contact with said negative electrode.

5. The non-aqueous electrolyte secondary battery defined in any one of claims 1 to 3, wherein the polymer of said polymer membrane is lithium-ionically conductive.

6. The non-aqueous electrolyte secondary battery defined in any one of claims 1 to 3, wherein a separating membrane layer is provided between said positive electrode and said polymer membrane.

7. The non-aqueous electrolyte secondary battery defined in any one of claims 1 to 3, wherein said negative electrode comprises metallic lithium, lithium alloy or carbon material.

* * * * *